US006263636B1

(12) United States Patent
Corston

(10) Patent No.: US 6,263,636 B1
(45) Date of Patent: *Jul. 24, 2001

(54) BUILDING CONSTRUCTIONS USING BEAMS AND RELATED METHOD

(76) Inventor: Charles Corston, 501 Willow Ct. South, Bellingham, WA (US) 98225

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,366

(22) Filed: Feb. 17, 1998

Related U.S. Application Data

(63) Continuation of application No. 08/309,753, filed on Sep. 21, 1994, now Pat. No. 5,718,092, which is a continuation-in-part of application No. 08/076,274, filed on Jun. 11, 1993, now Pat. No. 5,403,414, which is a continuation of application No. 07/761,686, filed on Sep. 18, 1991, now abandoned.

(51) Int. Cl.[7] .............................. B29C 44/06; B29D 9/00

(52) U.S. Cl. .......................... 52/741.1; 52/309.8; 52/575; 156/78; 264/46.4

(58) Field of Search ................................ 52/403.1, 404.2, 52/393, 480, 481.1, 483.1, 575, 573.1, 309.4, 309.5, 309.8, 309.9, 741.3, 741.4, 717.03, 717.05, 745.05, 745.2, 746.1, 741.1; 156/71, 78

(56) References Cited

U.S. PATENT DOCUMENTS 2,016,566 * 10/1935 Winship .
3,121,977 * 2/1964 Bersudsky .
3,385,018 * 5/1968 Harry .
3,588,082 * 6/1971 Chiffoleau .............................. 269/49
3,662,509 * 5/1972 Studzinski .
3,879,255 * 4/1975 Mason et al. ........................ 156/527
4,047,346 * 9/1977 Alderman ............................... 52/407
4,128,984 * 12/1978 Charbonneau et al. ............ 52/746.1
4,134,702 * 1/1979 Thunes ................................ 405/195
4,244,901 * 1/1981 Wencley et al. .
4,453,363 * 6/1984 Koller ................................ 52/481.1
4,742,654 * 5/1988 Cole ........................................ 52/97
4,858,399 * 8/1989 Salato ...................................... 52/97
4,914,883 * 4/1990 Wencley .
5,148,644 * 9/1992 Weir ...................................... 52/300
5,209,036 * 5/1993 Cancilliari ........................... 52/309.4
5,254,203 * 10/1993 Corston ............................... 156/391
5,403,414 * 4/1995 Corston ................................. 156/71
5,425,908 * 6/1995 Merser ................................ 264/46.4
5,475,959 * 12/1995 Mackenzie .......................... 52/403.1
5,489,468 * 2/1996 Davidson ............................. 428/261
5,718,092 * 2/1998 Corston .............................. 52/403.1
5,787,651 * 8/1998 Horn et al. ............................. 52/144

* cited by examiner

*Primary Examiner*—Robert Canfield
(74) *Attorney, Agent, or Firm*—Todd N. Hathaway

(57) ABSTRACT

A floor, wall, roof, or ceiling of a building is made of specially adapted beams and overlying panels. The beams have a layer of foam material on their edges. The foam material can include a resiliently compressible material, a thermally insulating material, or a material which possesses both of these properties. The panels are positioned over the beams so that the foam material is sandwiched between the beams and the panels. When the panels are fastened to the beams, the resiliently compressible foam material partially compresses, thereby filling any gaps which may form between the beams and the panels. The resiliently compressible foam material thus prevents relative movement between the panel and the beams which would otherwise produce squeaks. When the foam material includes thermal insulating material, it forms a thermal barrier between panels and beams, especially metal beams, thereby eliminating various drawbacks of construction using metal beams.

3 Claims, 9 Drawing Sheets

BUILDING CONSTRUCTIONS USING BEAMS AND RELATED METHOD

This is a continuation of application Ser. No. 08/309,753, filed Sep. 21, 1994, now U.S. Pat. No. 5,718,092, which is a continuation-in-part application of application Ser No. 08/076,274, filed Jun. 11, 1993, now U.S. Pat. No. 5,403, 414, which is a continuation of application Ser No. 07/761, 686, filed Sep. 18, 1991, now abandoned.

FIELD OF THE INVENTION

The present invention relates generally to the construction of buildings using beams, such as wall studs, floor joists, and ceiling rafters, and, more particularly, to a method for constructing such structures with a layer of foam material positioned between the beams and overlying panels. The studs, joists and rafters may be made of wood or metal.

BACKGROUND OF THE INVENTION

Buildings are generally constructed with floors, walls, ceilings, or roofs made of beams and panels which overlie or cover the beams. A problem which is encountered in constructing such buildings is the frequent development of squeaks.

In many structures, floors are constructed by installing a series of narrow joists—either metal or wooden—to provide support, and then placing panels of plywood or similar material on top of these. In this type of construction, squeaks often develop where a gap between the joist and the plywood permits the plywood to flex up and down as a person walks across the floor. Because it is usually necessary to remove carpeting and/or a ceiling to get at the source of the problem, repairing such squeaks is usually very expensive.

The conventional measure which has been adopted to combat this problem has been to glue the panels of plywood to the joists. This technique has been marked by only very modest success. For example, in the case of wooden floor joists, as the wood dries out, the warpage frequently becomes so great that the glue line simply breaks and the glue therefore becomes ineffective. Also, because such glues set up within a limited period of time, construction workers must place the panels on the joists almost immediately after the glue has been dispensed, which interferes with flexibility in managing the construction tasks of the projects. Furthermore, in very hot or cold climates, the glue tends to set up quickly, which aggravates this problem. Also, most such glues cannot be used when it is raining. Finally, when the panels are slid into place along the tops of the joists the glue is often scraped off, leaving bare spots where no glue is left to form a bond, making this conventional technique even less effective.

Accordingly, there exists a need for a method of constructing floors which effectively eliminates the development of squeaks. Furthermore, there is a need for such a method which is economical and convenient to practice, and which can be used in a wide range of environmental conditions.

Metal wall studs, floor joists and ceiling rafters, collectively referred to below as metal beams, offer builders and owners many significant economic and other advantages over traditional wooden beams (e.g., 2×4's, 2×10's, etc.). For example, such metal beams tend to be stronger and more resistant to deterioration. As a result, construction using metal beams is becoming increasingly common in both residential and commercial building.

Despite the inherent advantages which metal beams offer, metal construction has exhibited a number of drawbacks in practice. In particular, because the metal beams are highly thermally conductive, they tend to conduct heat away from the siding, flooring, sheet rock, or other panel covering much faster than would corresponding wooden beams; for example, the thermal conductivity of typical steel studs and other metal beams is about 320 btu/ft$^2$/hr/° F., as compared to a typical figure of about 120–140 btu/ft$^2$/hr/° F. for wood. As a result, "cold spots" are formed on the outer surface of the wail or floor covering, usually in the form of a series of spaced apart lines or bands which correspond to the arrangement of the underlying metallic beams comprising the metal framing. This tendency to conduct heat away from the wall or floor covering is increased by the normal practice of securing the materials together with metal fasteners (for example, screws).

Several additional problems stem from the high thermal conductivity of structures made using metal beams. Firstly, the cold spots cause condensation to form on the panel surface of the structure's exterior; this can often be observed as a series of vertical bands along the side of the structure. This leads to accelerated deterioration of paint or other finishes in these areas, and, also, (especially in cooler climates) fosters the growth of mildew which is both unsightly and difficult to eradicate. In addition, the moisture tends to be drawn into the panel along the metal beam, and will sometimes actually migrate along the metal beam into adjacent wooden supports, resulting in rot problems and, after prolonged exposure to moisture, the metal beams may rust.

Another problem which may develop from the thermal conductivity of metal studs, joists, and rafters is that the thermal integrity of the structure may be severely compromised. Specifically, the metal studs may conduct heat away from the interior of the house and out through panel walls, greatly reducing the house's energy efficiency.

Some attempts have been made to deal with the problems described above by using a metal foil which covers the inner surface of the wall or floor covering. Unfortunately, possibly owing to thermal conductivity of the foil material itself, this solution has generally proven ineffective, and in some cases appears to have actually aggravated the problem, especially by tending to draw moisture more rapidly into the wall. In addition, the foil and the beams generally are made of dissimilar metals. This dissimilarity causes electrolysis to occur between the metal beams and the metal foil, which in turn weakens the metal beam over time. Finally, the cost of the foil material renders this approach prohibitively expensive.

As a result, there exists a need for an effective and economical solution to the problems which are posed by the thermal conductivity of metal frame construction, as these have been described above.

SUMMARY OF INVENTION

The present invention has solved the problems cited above, and, according to one aspect of the invention, comprises a building with floors, walls, roofs, and ceilings from panels attached to beams. At least two of the beams have a layer of foam material on their edges, and each panel covers a substantial longitudinal portion of the two beams while also spanning the beams. The beams can be joists, studs, or rafters, and can be made of metal or wood. The panels typically are far thinner than the beams (panels typically about ¼ inch to 1 inch in thickness and beams at least 1.5 inches thick) and usually come in 4 by 8 foot sheets. In a preferred embodiment, the panel will have both a width and a length in excess of the spacing of the beams.

The foam material according to another aspect of the invention, includes a resiliently compressible material. The foam material can also be formed into an adhesive tape with a slick, non-adhesive outer layer which faces out from the beam when the tape is adhered to the beam's edge.

According to still another aspect of the invention, the foam material comprises a thermally insulating material which forms a thermal barrier between the panels and the beams on which the insulating material is disposed.

Yet another aspect of the invention is a specially adapted beam which includes the foam material on an edge of the beam.

According to still another aspect of the invention, a plurality of the above described beams are assembled into frame structures for walls, floors, ceilings, or roofs, with the layer of foam material disposed on predetermined edges of the frame structure in accordance with the particular usage contemplated for the frame structure at the job site.

Another aspect of the invention involves a method of constructing floors, walls, ceilings, or roofs of buildings. The method includes the steps of installing a plurality of beams, depositing the foam material onto the edges of at least two of the beams, and covering a substantial longitudinal portion of the two beams with one or more panels. The panels also span the beams generally perpendicularly to the longitudinal direction of the beams.

Another aspect of the present invention is a method of eliminating squeaks in a floor by depositing a resiliently compressible material on at least two joists and covering the joists with panels which span the joists and cover a substantial longitudinal portion of the joists. Fasteners are driven through the panel, through the resiliently compressible material, and into the joists, thereby partially compressing the compressible material and preventing any movement of the panels relative to the joists which might cause squeaks.

Yet another aspect of the present invention is a method of attaching a panel to a metal beam by depositing a thermally insulating material on the metal beam and mounting the panel to the beam to sandwich the insulating material between the beam and the panel. A thermal barrier is thus formed between the panel and the beam.

Further, objects and advantages of the invention in addition to those described above will be understood by a reading of the detailed description of the invention and a review of the accompanying drawings.

DETAILED DESCRIPTION a. Overview

Figure 1:
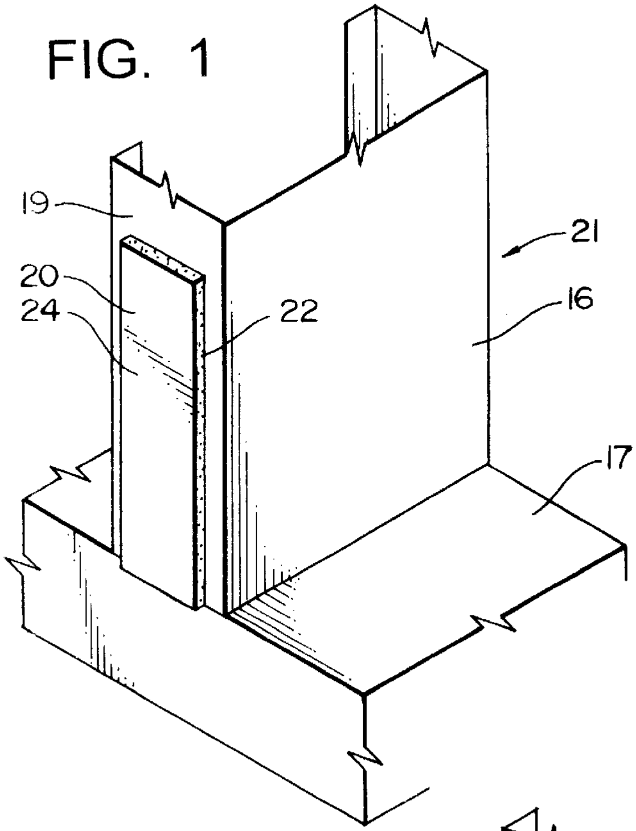
FIG. 1 is a perspective view showing a portion of a building, such as the frame structure of a wall, built in accordance with an aspect of the present invention.
Figure 2:
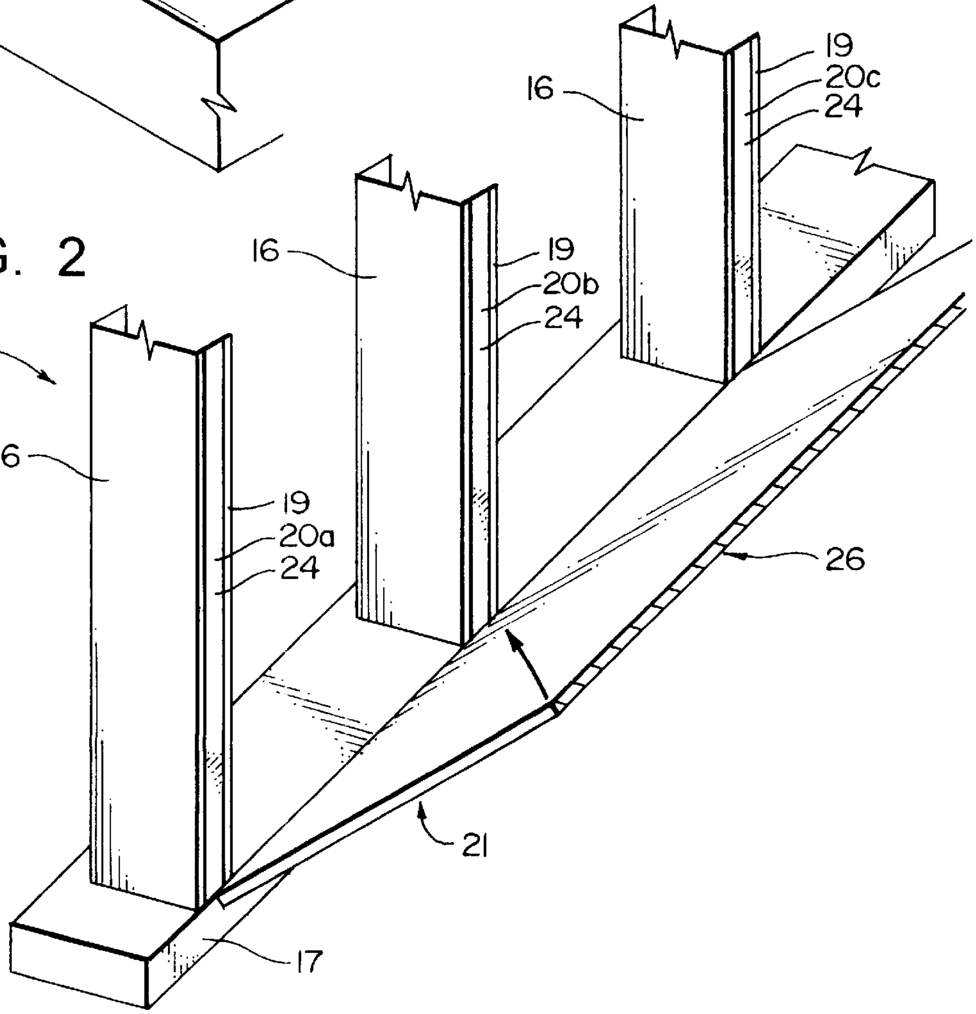
FIG. 2 is a perspective view showing a larger portion of the building of FIG. 1 built in accordance with the present invention.

As shown in FIGS. 1 and 2, a frame structure, such as a wall 21, built in accordance with the present invention, includes a series of metal beams 16, which act as wall studs. The metal beams 16 are attached to a rim joist 17 or other suitable support. The metal beams 16 are generally rectangular in cross section, and have vertically extending outer faces 19. A panel 26 (FIG. 2), such as a sheet of wallboard 22, is secured to the outer faces 19 of the beams 16.

A foam material 22 is disposed on the outer faces 19 of the metal beams 16. As will be described in greater detail below, the foam material 22 may be a thermally insulating material, a resiliently compressible material, or a material exhibiting both properties simultaneously, depending on the particular requirements of the building. Polyvinyl chloride, polyethylene, or rubber foam are suitable for the material 22 and exhibit both superior thermal insulation and resilient compressibility properties.

The foam material 22 is formed into a strip of tape 20. The bottom surface of the tape 20 is provided with a layer of adhesive by which the tape 20 is affixed to the outer face 19 of the beam 16, and the top of the tape 20 is preferably provided with a slick, tough, non-adhesive top layer 24, which may suitably be formed of Mylar™ or other slick, tough, nonadhesive material.

Figure 3:
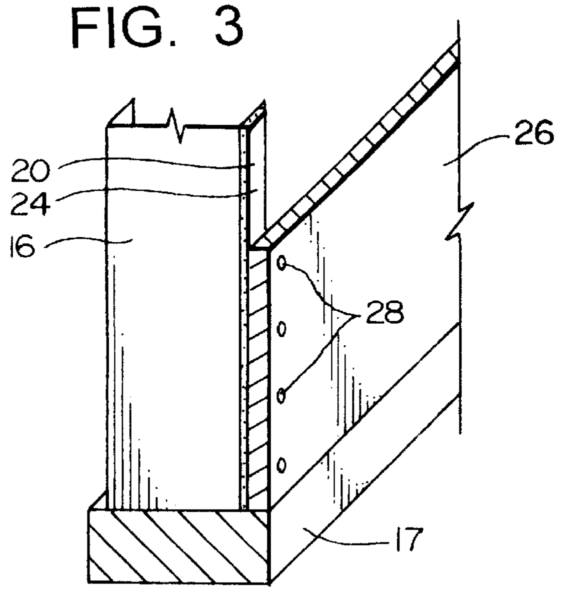
FIG. 3 is a perspective view showing the construction of the wall of FIGS. 1 and 2.

The panel 26 (FIG. 2) has portions which overlie the metal beams 16 so that the tape 20 is sandwiched between the beams 16 and the overlying portions of the panel 26. The slick, non-adhesive top layer 24 of the tape 20 permits the panel 26 to be slid back and forth into position. Fasteners 28, such as screws, are then driven through the panel 26 and into the beams 16 so as to secure the panel of wallboard 26 in place, as can be seen in FIG. 3. Additional panels (not shown) are attached in a similar manner and adjacent to the panel 26 to overlie the beams 16 and form the wall 21.

Each of such panels 26 are sufficiently wide and long to span a plurality of beams while covering a substantial longitudinal portion of the beams. For example, currently, standard panels are 4 feet wide by 8 feet long and will therefore cover either 4 or 7 beams laid on 6-inch centers while extending along respectively 8 feet or 4 feet of the longitudinal portions of the beams. Such panels, when cut down from 4×8 feet panels or otherwise obtained, are always substantially longer and wider than the width or thickness of the beams 16, whether the beams are joists, studs, or rafters.

Figure 4:
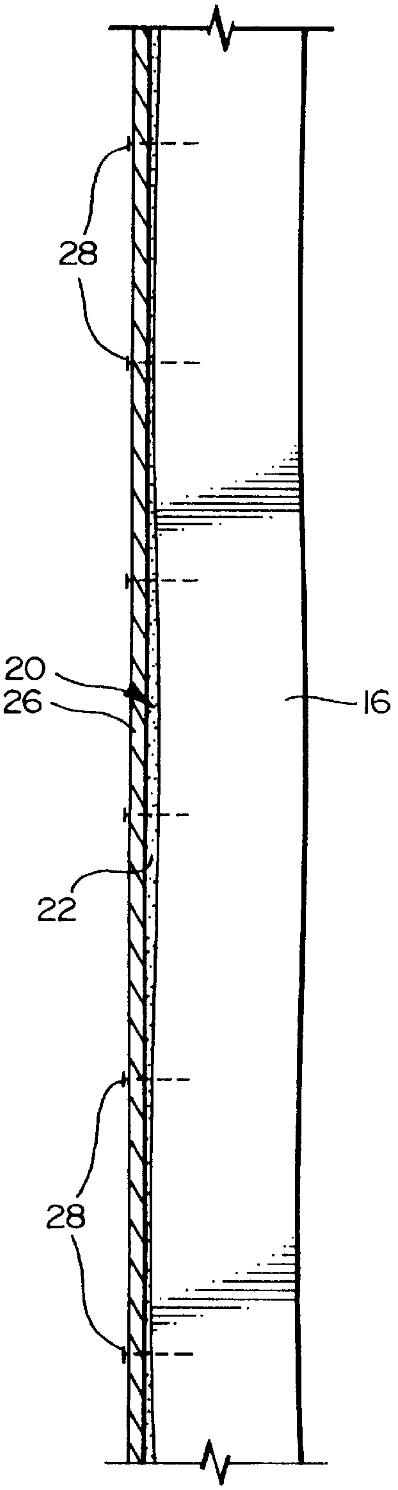
FIG. 4 is a cross-sectional view of the wall of FIGS. 1–3.

As the panel 26 is attached to the beam 16, the tape 20 is partially compressed so as to fill any irregularities and gaps between the studs 16 and the portions of the wallboard 26 overlying the studs 16, as shown in FIG. 4, so as to provide a continuous, insulating layer between the two. Because of its insulating qualities, the tape 20 serves as a thermal break which interrupts the conductive contact between the beams 16 and the overlying portions of the panel 26. Since this prevents heat from being conducted away from the panel 26 and through the studs 16, the formation of "cold spots" is virtually eliminated. This, in turn, eliminates condensation which has led to the problems described above.

The tape 20 also serves functions in addition to providing a thermal break, depending on the nature of the structure in which it is used. In particular, when used in the construction of a floor 50, as shown in FIGS. 7–10, tape 60 includes the same foam material 22 described with reference to the tape 20. The foam material comprises a resiliently compressible material which compensates for or "smooths out" irregularities and discontinuities between joists 52 and overlying panels 66 of plywood flooring. This usage of the tape 60 eliminates any gaps which would otherwise permit the panels 66 to work up and down and cause squeaks.

b. Insulating Material

Figure 5:
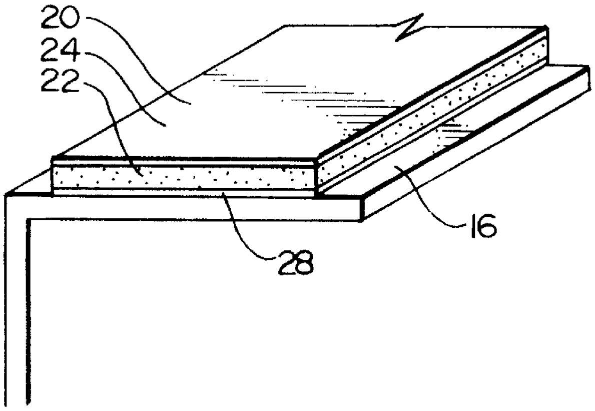
FIG. 5 is an enlarged perspective view of a section of a beam of the present invention.

FIG. 5 shows a short segment of the tape 20 adhered to a section of the beam 16, and illustrates, in enlarged detail, the various layers of material of which the tape 20 is composed. The tape 20 includes a layer of foam material 22 which exhibits superior thermal insulation qualities and adequate product life for permanent installation in a structure. The material 22 is sufficiently soft and thick that it resiliently compresses between the beam 16 and the overlying portion of the panel 26 of wallboard or other covering (FIGS. 2 and 4) so as to fill any gaps, but without being so severely compressed as to lose its insulating qualities.

Thus, as shown in FIG. 4, when the panel 26 is installed using fasteners 28, the foam material 22 compresses to a certain degree, for example, down to about 50% of its original thickness However, even when partially compressed, it retains the ability to provide a thermal break and the resilience necessary to fill any gaps between the two members. The foam material 22 also inhibits passage of moisture, and thereby reduces any potential for rust on the metal beams 16 which may form after prolonged periods of exposure to moisture.

Polyvinyl chloride (PVC) foam, closed-cell polyethylene foam, and rubber foam have proven to be eminently suitable materials for the foam material 22 in the present invention. Unlike conventional glue, these materials retain their resilience indefinitely, with the service life of these materials being roughly equivalent to that of the structure itself. Moreover, they exhibit excellent thermal insulation qualities; for example, the conductivity of a ⅛" thick layer of the PVC foam material is about 2.24 btu/ft$^2$/hr/° F., as compared to 320 btu/ft$^2$/hr/° F. for uninsulated metal.

The thickness of the foam material 22 will vary somewhat depending on the softness and insulating qualities of its constituent material, as well as the size of the gaps between the beams 16 and the corresponding paneling 26 which the material 22 will be expected to fill. When using the PVC or polyethylene materials described above, suitable uncompressed thicknesses for the material 22 have been found to range to about 1" thick maximum, with about 1/16" to ⅛" being preferred.

The width of the tape 20, in turn, preferably corresponds generally to the width of the edge of the beam 16 on which it is to be installed; for standard metal studs used in residential construction, a width of about 1 7/16" is suitable, whereas a width of about 3¼" is suitable for the wider joists 52 common in the flooring 50 (FIGS. 7–10). In addition to the above-described width the tape can be any width required for the particular application.

The tape 20 has an adhesive bottom surface 28 (FIG. 5) which impregnated or coated with a suitable adhesive material, such as a rubber-based pressure sensitive adhesive. The adhesive material facilitates the laying the strips of the tape 20 on the beams 16 and acts to hold the strips in place while the paneling 26 (FIG. 2), 6 (FIG. 8) is being installed. The adhesive is preferably sufficient soft and sticky to adhere to the beam 16 (FIG. 5) even if it is somewhat damp. The density of the adhesive can be adjusted somewhat depending on the desired characteristics and intended use of the material; for example, higher adhesive densities may be preferred where it is to be applied to relatively wet or rough surfaces, while lower densities may be preferred where it is desired to make it easier to peel the tape 20 when it is stored in a roll (see FIGS. 6A & B). Also, in some embodiments, it may be preferable to encapsulate at least a portion of the adhesive material in closed cells with the foam layer 22 of the tape 20, such cells being configured to rupture under the pressure which is applied as the tape 20 is press against the beam 16 during installation, releasing the adhesive so that this will permeate the interface between the beam 16 and the foam layer 22.

The tape 20 includes a non-adhesive top layer 24 disposed on top of the foam material 22. The top layer 24 both facilitates the unwinding of the tape 20 when it is rolled up (FIGS. 6A and 6B) and enables the builder to slide the panels 26, 66 of wallboard or plywood (FIGS. 2–4 and 7–10, respectively) over the top layer 24 during installation. This non-adhesive top layer 24 is preferably tough and slick so as to further facilitate the sliding of the paneling 26 over the top layer 24 without damaging the tape 20, 60. A suitable top layer 24 may be a thin (e.g. 1–4 mil) polyester liner such as a Mylar™ film which is mounted to the underlying foam 22 with a thin layer of adhesive. Alternatively, the non-adhesive top layer 24 may comprise a release paper, or may be formed by heat sealing the upper surface of the foam material 22 or creating a suitably smooth surface integral to the foam material 22.

Since the non-adhesive top layer 24 contacts overlying portions of the panels of wallboard 26 (FIGS. 1 and 2) and of flooring 66 (FIG. 8), it is understood that, for most applications, it is not necessary for the tape 20, 60 to hold the panels of wallboard 26 (FIG. 2) or flooring 66 (FIG. 8) in place In addition, because the top layer 24 is non-adhesive, personnel can handle the beams 16, whether they be studs, joists or rafters, after the insulating tape 20 has been laid thereon. In the case of the joists 52 (FIGS. 7 and 8), personnel can even walk about on top of the joists 52 where the tape 20, 60 has been installed (see FIG. 11). Moreover, personnel can slide the panel 26 over the top layer 24 and into place without the panels 26, 66 catching on the tape 20, 60 and damaging it. Use of the tape 20, 60 also eliminates the problem of excessively quick set-up times which are experienced with conventional glues. In addition, the application of the tape 20, 60, as opposed to the application of glue, can be separated in time from installation of the overlying panels or can be done in small blocks of time. The tape 20, 60 is not affected by any inclement weather which may intervene between the time of tape application and placement of the overlying panels. In light of the above, use of the tape 20, 60 improves work efficiency since the construction with beams and panels using the tape 20, 60 does not require large blocks of time to be schedule; but rather can be accomplished at the ends of working days or by intermittently spacing the work between other projects.

c. Installation

Figure 6A:
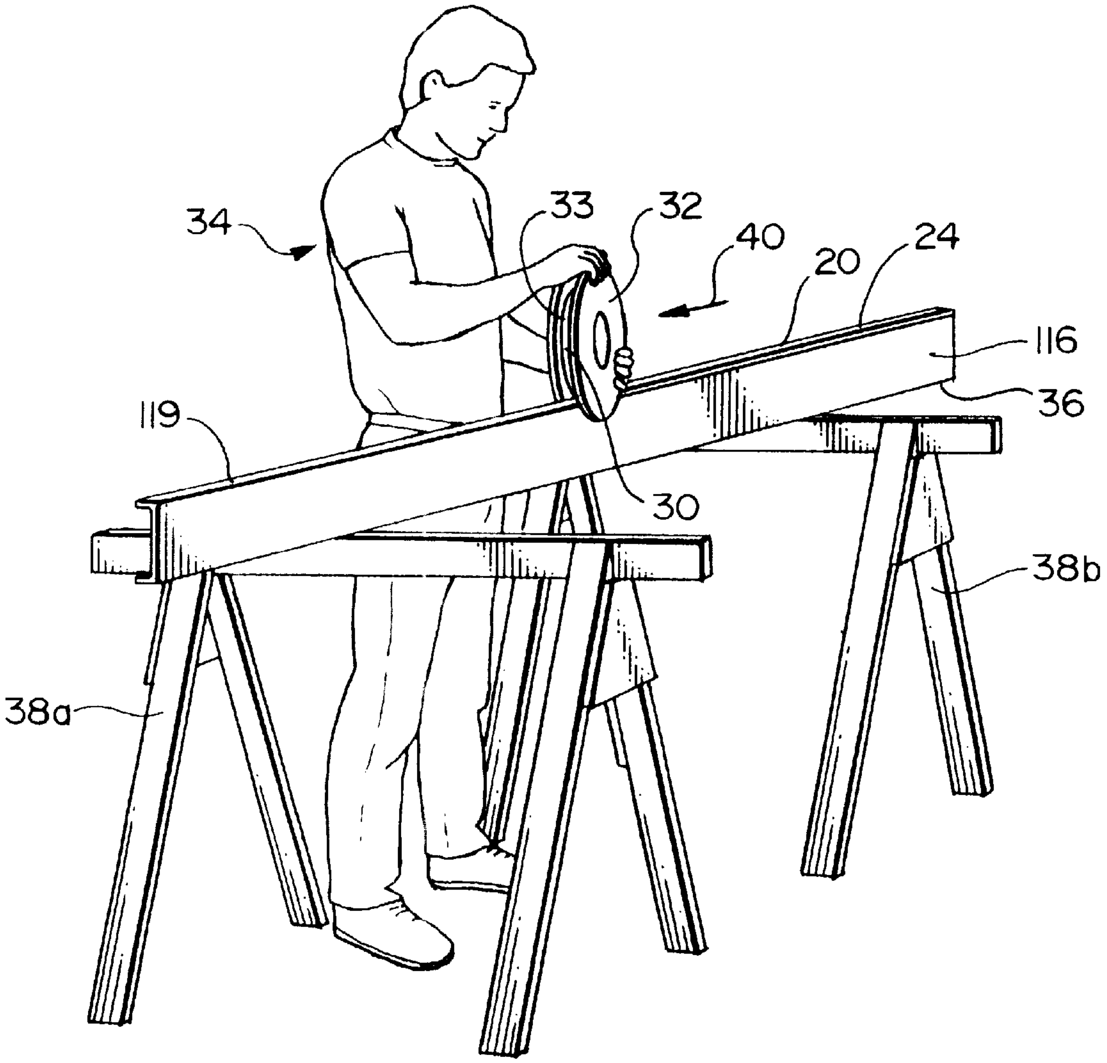
FIGS. 6A and 6B are perspective views showing the formation of the beam of FIG. 5.
Figure 6B:
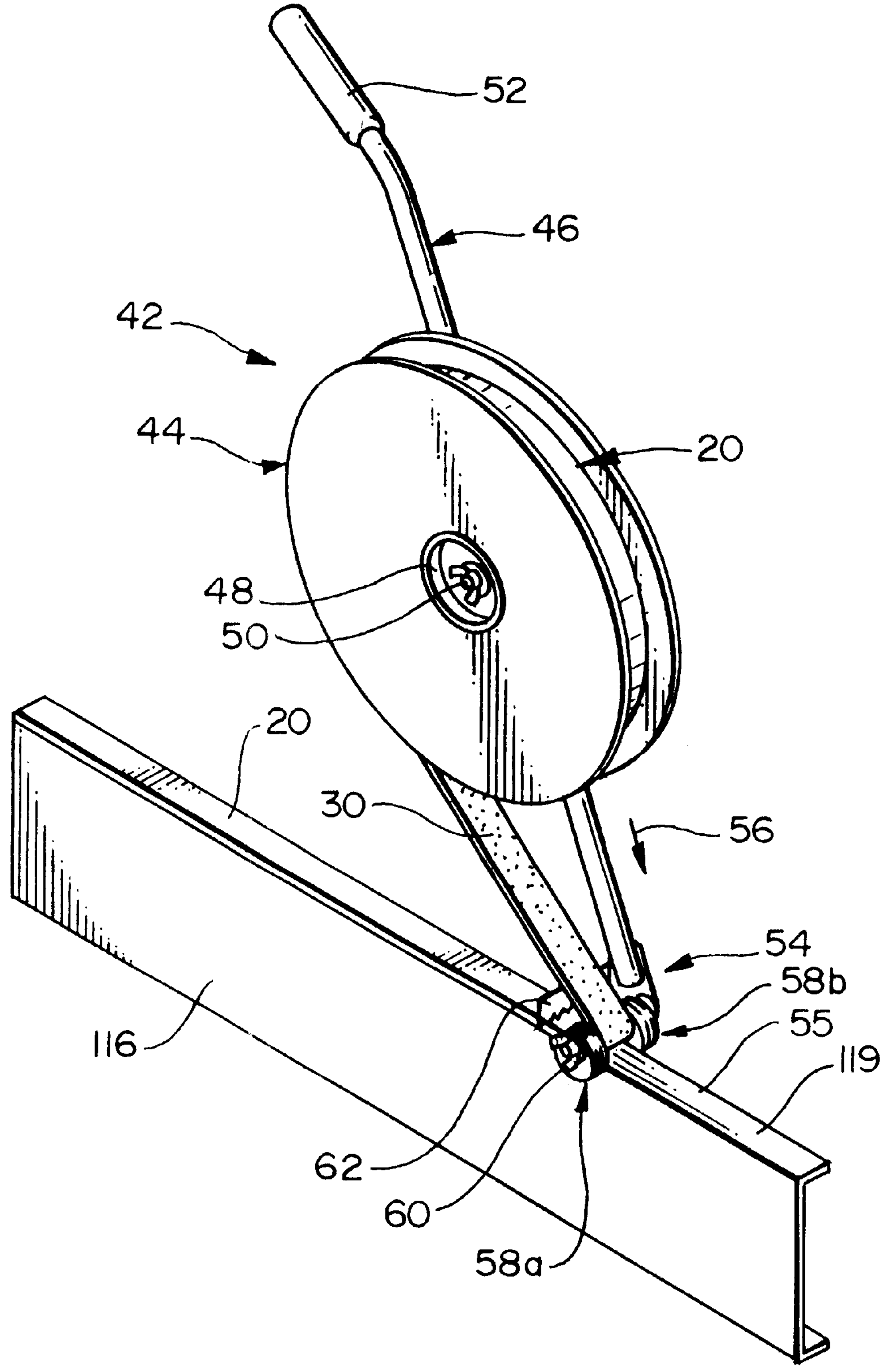

FIGS. 6A and 6B illustrate two preferred methods by which, in accordance with the present invention, the insulating tape 20 can be applied to a beam 116. The beam 116 may be a component o any frame structure of a building constructed of beams, such as floor, wall, ceiling, or roof. The beam 116 thus may be a stud, joist, or rafter.

In the method which is shown in FIG. 6A, the tape 20 is reverse wound on a roll or spool 32 so that the adhesive side 3 of the tape 20 faces outwardly therefrom. Consequently, as the spool 32 is rolled along the underlying surface 119 of the bea 116, the adhesive side 30 of the tape adheres to it so that the tape 20 unrolls from the spool 32, leaving the non-adhesive side 24 exposed and facing upwardly from the beam 116.

FIG. 6A shows an operator 34 laying a strip of the tape 20 on the beam 116 prior to the beam 116 being installed into a frame structure. This technique is particularly advantageous wherever building conditions, project schedules, or other factors render it preferable to lay the tape 20 on the beam 116 prior to it being put into the building structure. To do this, the operator places the beam 116 on a suitable support, such as saw horses 38*a*, 38*b*, and then grasps the spool 32 and rolls it along in the direction indicated by arrow 40 so as to lay the strip of tape 20 on the upper edge 119 of the beam 116. The spool 32 has a peripheral channel 33 formed between flanges 35. The channel 33 is sized to receive the edge 119 of the beam 116 and thus helps to guide the spool 32 as it is rolled along the beam 116. The beam 116 can then be lifted or otherwise transported to the installation site.

FIG. 6B, in turn, shows a hand-operated tool 42 which can be used to apply the adhesive insulating tape 20 in accordance with another aspect of the present invention. The tool is similar to that described in U. S. Pat. No. 5,254,203. The tool 42 comprises a spool portion 44 which is mounted part way up along handle portion 46. The spool portion 44 is provided with a central hub 48 which rotates about an axle 50 perpendicular to the handle portion 46. The spool portion 44 contains a roll 32 of the adhesive cushioning tape 20 which is wound with the adhesive side facing inwardly.

Preferably, the handle portion 46 may be about 2' in length, with a length of 22" being an excellent compromise in terms of both handling ease and packaging convenience (when using standard 24" boxes). Tubular metal conduit of ¾" has been found to be eminently suitable for forming the handle 46, from the standpoint of cost, weight, and ease of fabrication. The upper end of the handle portion 46 is bent slightly rearwardly (e.g., about 10°–20°) from the lower portion to provide a more horizontal portion which can be conveniently held by a standing operator, and this is preferably provided with a hand grip 52.

The lower end of the handle 46, in turn, is provided with an adjustable guide roller assembly 54 which presses the tape 20 against the edge 55 of the beam 16 so that it firmly adheres to the upper surface 119. The tape 20 is fed off the rearward side of the spool and led downwardly and under the guide roller assembly 54. Thus, as the tape 20 passes under the roller assembly 54, it is pressed against the upper surface 119 of the beam 116 by pressure which is exerted through the handle portion 46 of the tool 42 in the direction indicated by arrow 56.

The guide roller assembly 54 includes two compound sidewall assemblies 58*a*, 58*b* which form a channel for receiving both the upper surface 119 of the beam 116 and the strip of tape 20 which is unrolled from the spool portion 44. Each of the compound sidewalls 58*a–b* is made up of a plurality of plate-like elements which are individually displaceable in an upward direction by rotation about the axle of the assembly 54, so as to be able to adjust the channel width to match that of the upper surface 119 of the beam 116. The plate elements are then locked in place by means of a wing nut 60 on the end of the axle. The guide roller assembly also includes a cutter 62 which is employed to cut the tape 20 after a predetermined amount, known as "a run" has been laid on the upper surface 119 of the beam 116.

Figure 7:
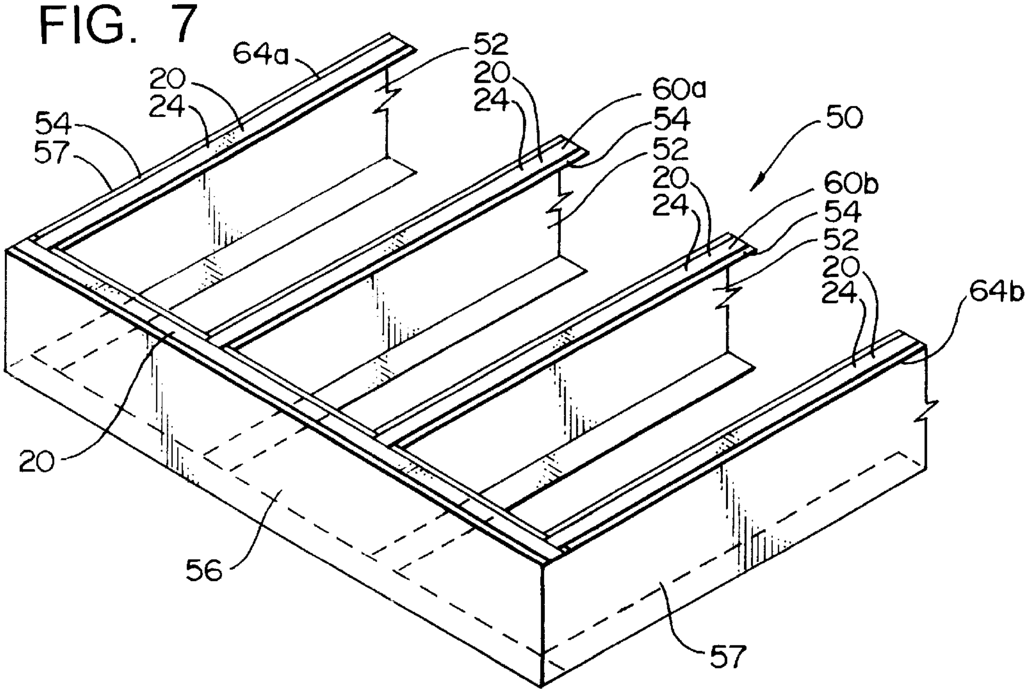
FIGS. 7 and 8 are perspective views of a portion of another frame structure, such as a floor, built in accordance with another aspect of the present invention.

The techniques which have been described are particularly suited to installation of the insulating tape 20 in a field environment, such as a job site. There is, however, an increasing trend towards factory fabrication of: the beams 16, such as joists, studs, and rafters; pre-assembled frame structures 23 (FIG. 2); and even complete walls, and other modular building components. The present invention is suitable for practice in such contexts as well. The beams 16, or even an entire frame structure 23 (FIG. 2), may be delivered to the job site ready to use, with the tape 20 already adhered to the edges of the beams 16 or predetermined edges of the frame structure 23 as seen in FIGS. 2 and 7, respectively.

In addition, the tape 20 can be applied using high-speed mechanized or automated systems in place of the manual approaches described above. Such systems may include mechanized applicators and rollers, and cartridge or continuous tape feed. Moreover, such systems may include suitable computerized controls which may be integrated with controls for the construction of the structural beam itself.

Figure 15:
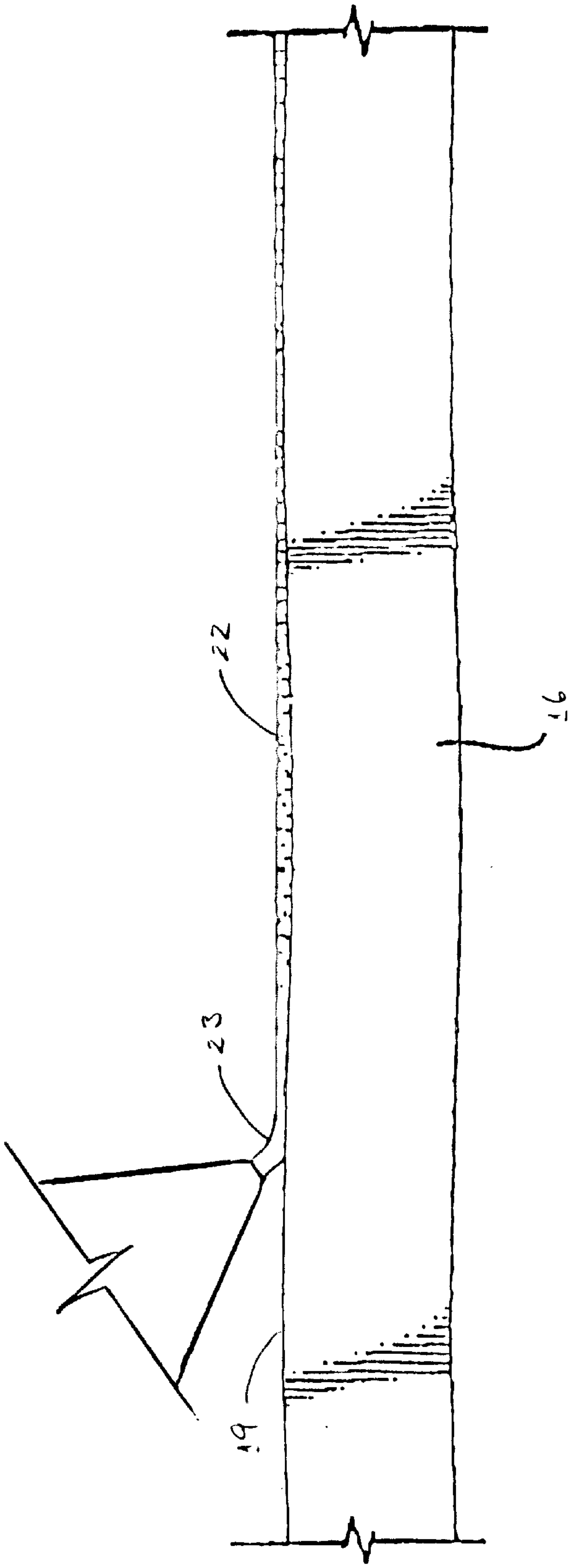
FIG. 15 is an elevational, somewhat schematic view, showing the depositation of a material in a fluid state on an edge of a beam so as to produce a semi-solid foam end product thereon.

Still further, it may be advantageous in some embodiments to dispense with the use of the tape 20 and apply the foam material 22 to the beams by other means. For example, FIG. 15 shows the material being deposited on the edge 19 of the beam 16 in a fluid or semi-fluid state, as indicated at 23, such as by a foamed-in-place system where the fluid constituents react to produce a semi-solid foam end product. As yet another alternate, instead of strips of the tape 20, the material 22 can be placed on the beam 16 by cutting a strip directly from a layer sheet of insulating material. It should also be noted that many of these techniques, although particularly adapted to factory operations, may find applications in a field environment as well.

d. Flooring Systems

The present invention presents many advantages not only in the construction of walls, but also in the construction of floors, ceilings, roofs, and other frame structures, particularly where these serve to separate areas of differing temperatures.

FIGS. 7–10 illustrate the present invention as applied to construction of another type of frame structure, namely, a floor 50. Floor 50 includes a plurality of metal joists 52, which are a particular type of the beams 16 described above with reference to FIGS. 1 and 2. The joists 52 extend in a horizontal direction with a planar load-bearing surface 54 facing in an upward direction. Such metal joists 52 can be sized similar to their conventional wooden counterparts (e.g., 2×12's), or may have much wider upper load-bearing surfaces (e.g., 3¼ inches wide or more), the latter being commonly referred to in the industry as "space joists." The joists 52 are arranged in generally parallel, laterally spaced relation to each other and are supported across their ends by a metal or wooden header 56. On either side of the metal joists 52 are rim joists 57.

In this embodiment, the floor 50 includes insulating tape 60 in strips laid upon the upper, load-bearing surfaces 54 of the metal joists 52. The tape 60 is formed using materials and a structure similar or identical to the tape 20. However, the width of the tape 60 may vary from the width of tape 20 since the upper surface 54 of the joist 52 may be different from that of the beams 16. So, for example, the tape 20 that is used on the narrower beams 16, such as studs, may be narrower than the tape 60 which is used on wider beams, such as the joists 52. To enhance both the effectiveness of the insulating tape 60 as applied to the joists 52 and to provide a flat, continuous surface for overlying subfloor panel 66, strips 62, 64 of the tape 60 may preferably be laid on the upper edges of the headers 56 and the rim joists 57 as well.

Figure 8:
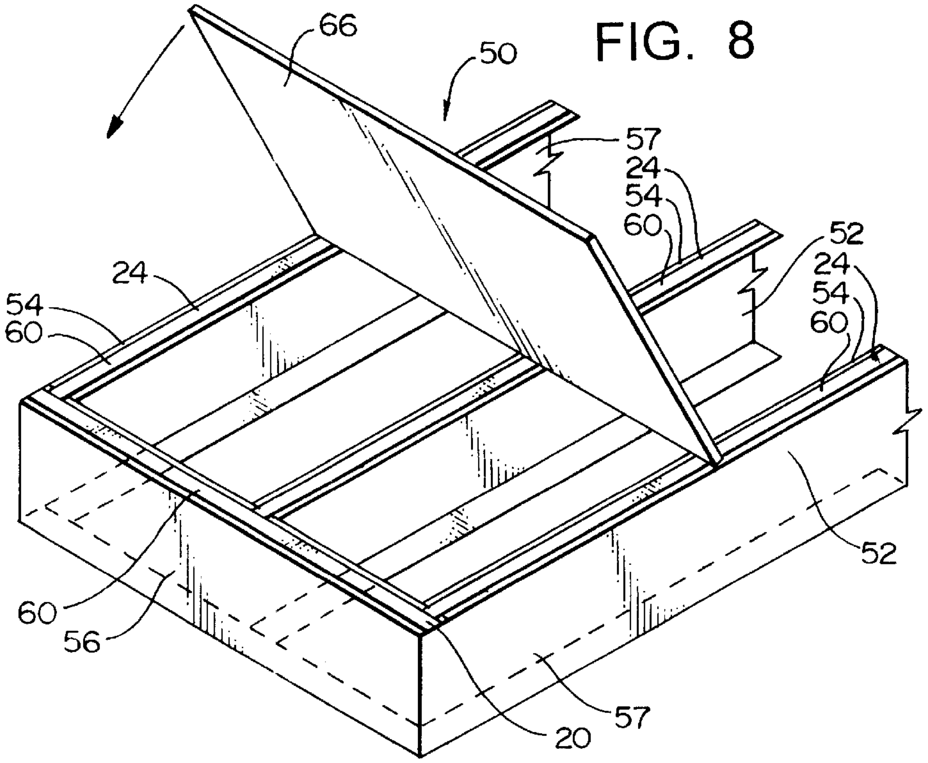
Figure 9:
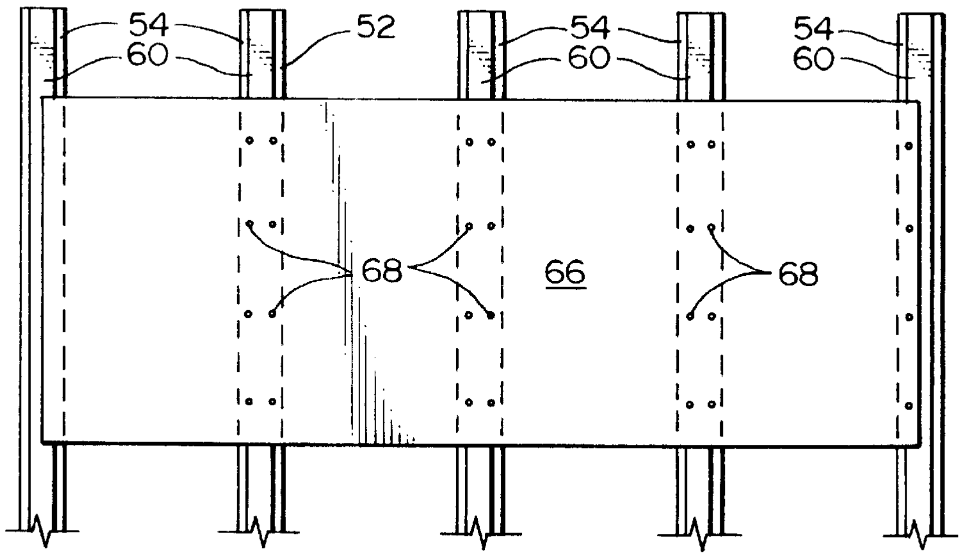
FIG. 9 is a plan view showing the floor of FIGS. 7 and 8.

After the strips of the tape 60 have been laid down, panels 66 of plywood or other subfloor panel material are placed on top of the tape 20, as shown in FIG. 8. The tough, slick, non-adhesive covering 24 of the tape 66 permits the panels 66 to be slid along and across surfaces of the joists 56 to the desired position without damaging the tape 60. Also, workers can walk about on the joists 52 without damaging the resiliently compressible material 22 (FIG. 5) underneath the covering 24. Preferably, as is shown in FIG. 9, the panels 66 are positioned so that their edges meet over the load-bearing top surfaces 54 of the joists 52 and are supported thereby. Since the panels 66 are not glued to the joists 52, they can be rearranged atop the joists 52 for optimum fit.

Figure 10:
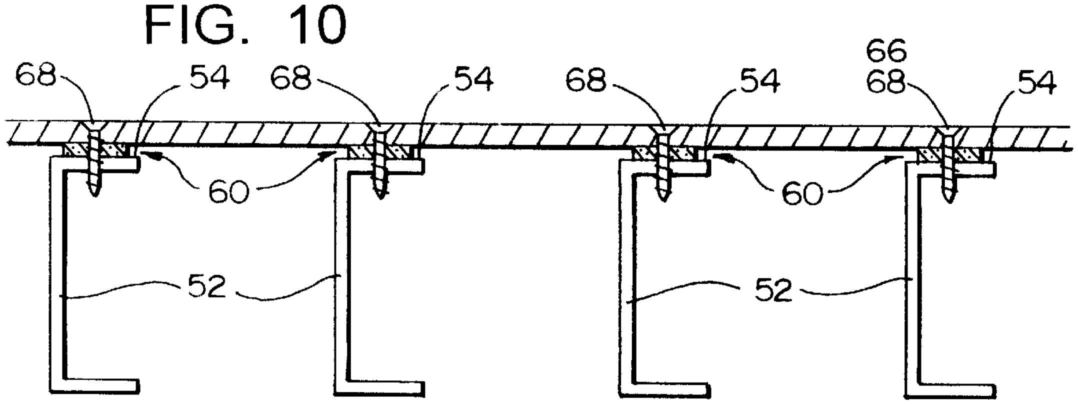
FIG. 10 is an end view of the floor of FIG. 9.

Finally, as is shown in FIGS. 9 and 10, the panels 66 are secured in place by means of fasteners 68, which are driven through the panels 66 and into the upper surfaces 54 of the joists 52.

The tape 60 is sandwiched between the floor joists 52 and the panels of subflooring 66. As discussed above with reference to FIGS. 1 and 2, this layer provides thermal insulation between the joists 52 and the panels 66. The tape 60, since it is made of the foam material 22 (FIG. 5) which is resiliently compressible, also acts to "smooth out" irregularities and discontinuities in the surfaces 54 of the joists 52 and the overlying portions of the panels 66. In this way, the tape 60 eliminates gaps between the joists 52 and the panels 66, which gaps would otherwise permit the panels 66 of subflooring to work up and down against the fasteners 68 (FIG. 9) and cause squeaks.

e. Wood Construction

Although the present invention has been discussed with reference to the metal joists 52, the invention also yields many advantages in buildings having floors, walls, ceilings, and roofs, made of wooden beams.

Figure 11:
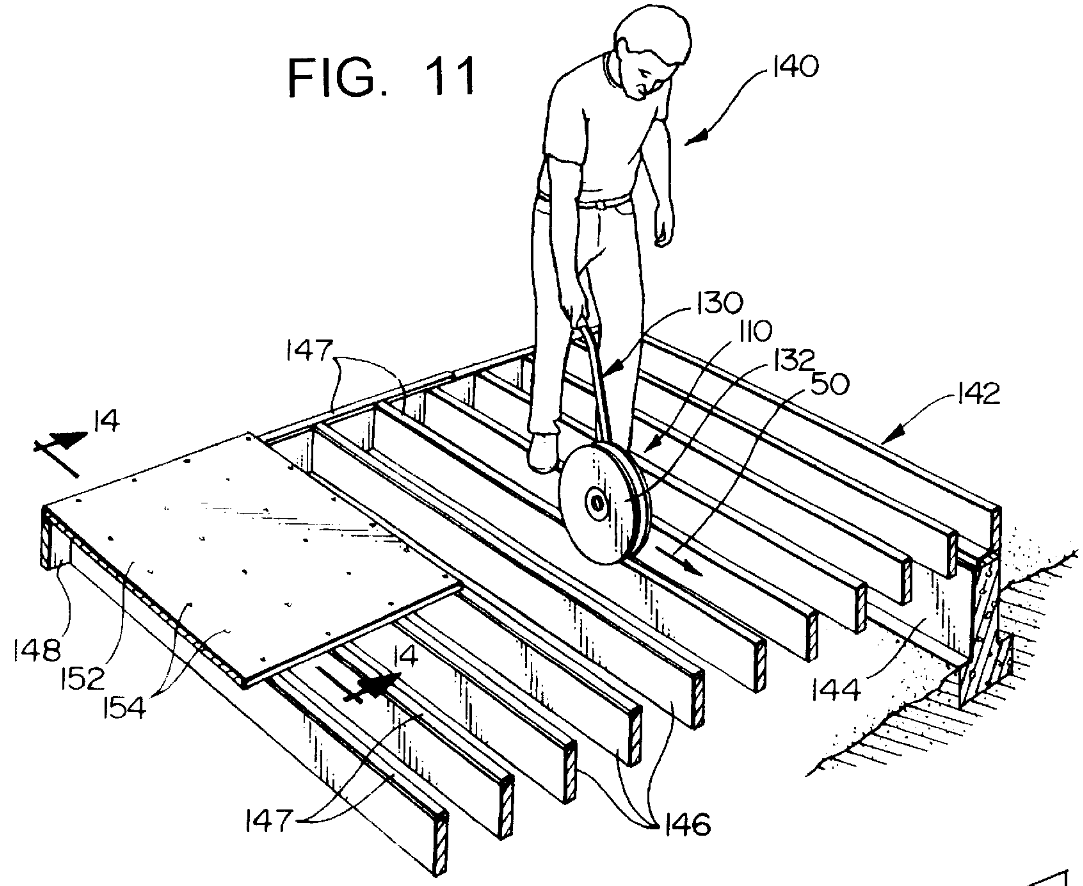
FIG. 11 is a perspective view showing a method of constructing another frame structure in accordance with the present invention.

For example, FIG. 11 shows a floor structure 142 having a generally conventional foundation 144 which supports a series of wooden floor joists 146 joined together at their ends by headers 148. For residential construction, the joists may typically be 2"×12" boards or the like, laid on edge. The tape 147 is composed of resiliently compressible material 22 described previously with reference to the tape 20 (FIG. 5), and is shown being installed using a tool 110. The tool 110 includes a handle 130 having a spool 112 similar to the spool 32 (FIG. 6B) mounted to the lower end of the handle 130. The operator 140 unrolls a bit of the tape 147 from the spool 112 and places it at the desired point on the joist 146. The top of the joist 146 is then slipped into the channel between the two flanges of the spool 142 so that the adhesive surface of the tape contacts and adheres to the joist. Then, using the handle 130, the operator rolls the spool 112 along the top of the joist 146 in the direction indicated by arrow 50; as this is done, a strip of the tape 147 unrolls from the spool 132 and adheres to the edge of the joist 146. If desired, the tape 147 can also be laid along the top of the header 148 as shown in FIG. 12.

Figure 14:
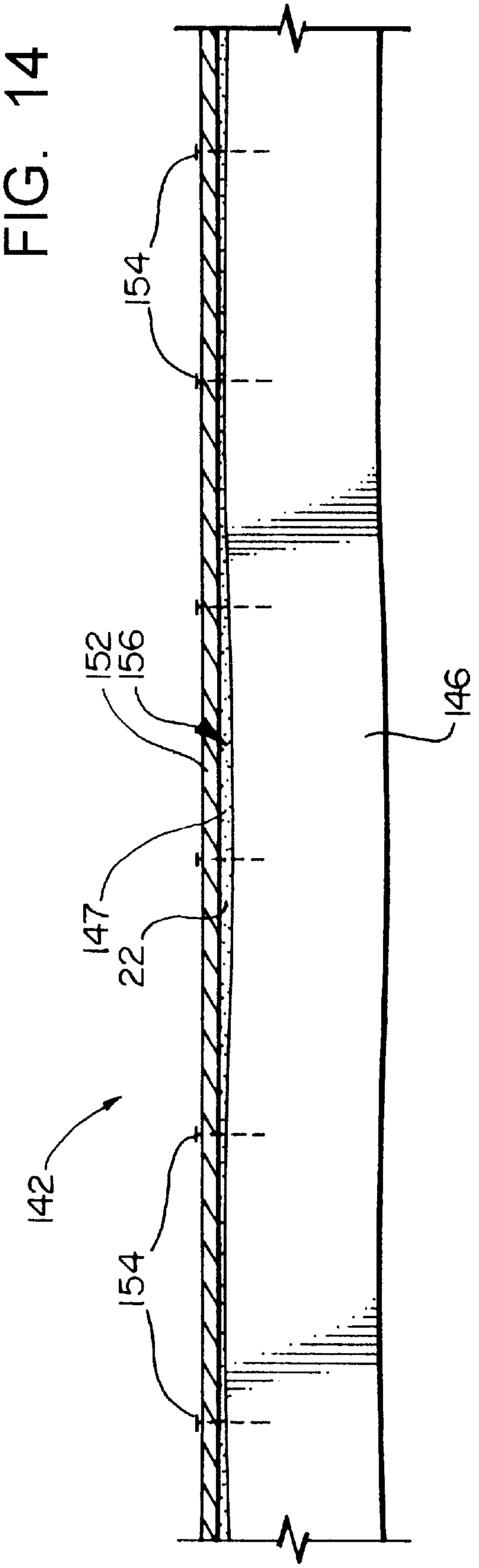
FIG. 14 is a cross-sectional view taken along line 14—14 of FIG. 11.

The panels 152 which make up the subfloor are then slid over the top surfaces of the joists 146 and into place as described previously with reference to FIGS. 7–10. The operator 140 is able to walk about on the non-adhesive, upper surface of the tape 147 while moving the panels 152 into place. FIG. 14 shows a cross-section through the flooring structure 142 having the cushioning tape 147 installed on the wooden joists 146. The uneven upper edge of the joists 146 (which may be due to warping or bowing of the joists) produces discontinuities or gaps 156 between the joists 146 and the overlying panel of plywood 152, which (if let unfilled) would allow the panel of plywood 152 to flex up and down as people walked across it, resulting in squeaks as the plywood rubbed against the shanks of nails 154. However, since the tape 147 provides a resiliently compressible foam layer when sandwiched between the panel 152 and the joist 146, the tape 147 fills the gaps 156 so as to prevent the plywood panel 152 from flexing downwardly by an appreciable distance under a person's weight, thus eliminating the vertical movement of the plywood panel 152 which could cause squeaking.

Furthermore, ring nails are a suitable type of fastener 154 used in the floor 142. When the ring nails are driven through the tape 147, a portion of the foam material 22 is picked up in the grooves along the shanks of the fasteners 154; in the unlikely event that the panel 152 lifts beyond the ability of the tape 147 to fill the resulting gap (as, for instance, if the plywood bows due to becoming wet), the "lubricating" affect of the foam material 22 which is retained on the shanks of the fasteners 154 will serve as additional assurance against the development of squeaks.

Figure 12:
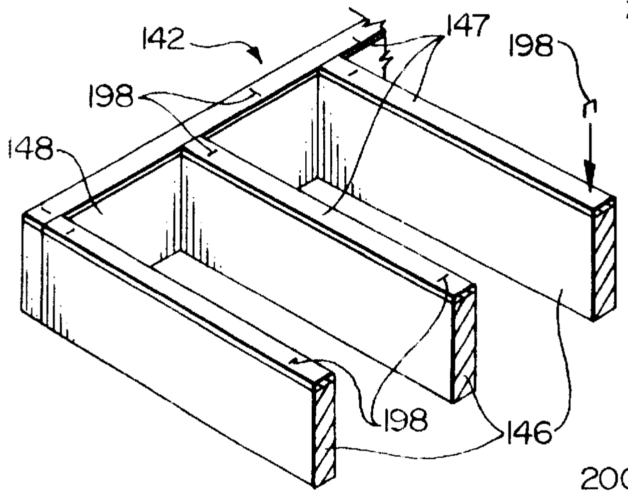
FIG. 12 is a perspective view of a portion of the structure of FIG. 11.

FIG. 12 shows the optional use of staples 198 to help hold the strips of the adhesive tape 147 on the upper edges of the joists 146. This may be desirable when conditions are so wet that the adhesive of the tape 147 alone has difficulty holding to the joist 146, especially when people are walking or sliding the panels of plywood 152 over the adhesive tape 147. However, it will be appreciated that using the staples 198 to hold the tape 147 in place is only necessary as a supplemental measure, and once the joists 146 are dry, the adhesive of the tape 147 preferably will adhere to the joists 146 so as to permanently hold the tape 147 in position.

Figure 13:
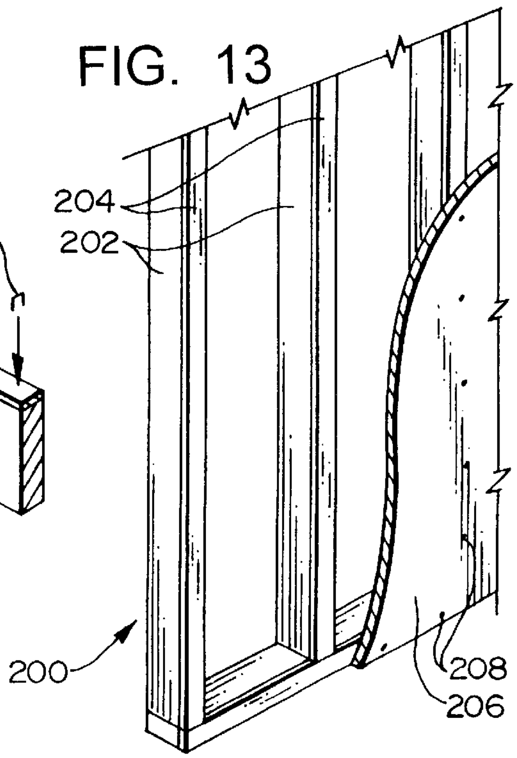
FIG. 13 is a perspective view of the frame structure of another wall embodying the present invention.

FIG. 13 illustrates the use of the present invention in the construction of a vertically extending wall structure 200 constructed using wooden studs 202. Apart from its vertical orientation, the configuration of this construction is similar to the floor structure 142 seen in FIG. 11. Strips of adhesive tape 204 formed of resiliently compressible, thermally insulating, foam material are laid on the edges of the studs 202 (using techniques substantially similar to those described above) , and then a suitable panel 206, such as wall covering, plywood or panel rock, is installed over the studs 202 using nails 208 or other suitable fasteners.

In frame structures such as the vertically extending wall structure 200, it is possible to provide the outwardly facing surface of the tape 204 with a certain degree of adhesiveness or "tackiness" which helps hold the panel 206 against the tape 204 and the studs 202. Typically, the panel 206 is mounted to the studs 202 by fasteners 208, such as screws, installed using an automatic screwdriver. As the fasteners 208 are installed, the resiliently compressible foam material of the tape 204 is partially compressed as discussed previously to provide a "filler" for any gaps that might otherwise occur between the paneling 206 and the studs 202, while still providing thermal insulation between the two.

Having described the invention in its preferred embodiments, it will be clear that numerous changes and modifications may be made without departing from the spirit of the invention. It is therefore not intended that the words used to describe the invention or the drawings illustrating the same be limiting on the invention, but rather that the invention be limited only by the scope of the appended claims.

What is claimed is:

1. A method of forming a specially adapted beam for use with panels to construct walls, floors, ceilings or roofs, said method comprising the steps of:

providing a conventional beam having an exposed edge; and depositing a layer of foam material on said edge of said beam in a fluid state so that constituents thereof react to form a semi-solid, resiliently compressible foam end product having a substantially non-adhesive top layer for subsequent installation of a panel thereover.

2. The method of claim 1, wherein the step of depositing said layer of foam material on said edge of said beam comprises the step of:

producing said foam material through a reaction of the constituents thereof.

3. The method of claim 1, wherein said beam is formed of a metal material.

* * * * *